United States Patent
Yin et al.

[19]

[11] Patent Number: 6,018,527
[45] Date of Patent: *Jan. 25, 2000

[54] QUEUE SERVICE INTERVAL BASED CELL SCHEDULER WITH HIERARCHICAL QUEUING CONFIGURATIONS

[75] Inventors: Nanying Yin, Newton; Marty Borden, Littleton, both of Mass.; Shiping Li, Los Altos, Calif.; Michael Hluchyj, Wellesley, Mass.

[73] Assignee: Nortel Networks Corporation, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/696,272

[22] Filed: Aug. 13, 1996

[51] Int. Cl.$^7$ .............................. H04L 12/56; H04J 3/16
[52] U.S. Cl. .......................... 370/412; 370/395; 370/468
[58] Field of Search ................................... 370/235, 236, 370/375, 378, 389, 395, 399, 412, 415, 416, 42, 429

[56] References Cited

U.S. PATENT DOCUMENTS

| | | | |
|---|---|---|---|
| 4,979,165 | 12/1990 | Dighe et al. | 370/60 |
| 5,268,900 | 12/1993 | Hluchyj et al. | 370/94.1 |
| 5,463,620 | 10/1995 | Sriram | 370/60 |
| 5,500,858 | 3/1996 | Mckeown . | |
| 5,533,020 | 7/1996 | Byrn et al. . | |
| 5,577,035 | 11/1996 | Hayter et al. . | |
| 5,629,918 | 5/1997 | Calvignac et al. | 370/237 |
| 5,640,389 | 6/1997 | Masaki et al. | 370/418 |

OTHER PUBLICATIONS

Mercankosk, Guven et al., "Multiplexing Spacer Outputs on Cell Emissions," IEEE Infocom 1995, Boston, Apr. 1995, pp. 49–55.

J. Rexford et al., "Hardware–Efficient Fair Queueing Architectures for High–Speed Networks", IEEE Infocom'96, Mar. 1996, pp. 638–646.

J. Hyman et al., "Real Time Scheduling with QOS Constranits", IEEE J. on Selected Areas in Comm. vol. 9, Sep. 1991, pp. 1052–1063.

Office Action for application Serial Number 08/792,624 mailed on Jan. 5, 1998, 5 pages.

*Primary Examiner*—William Luther
*Attorney, Agent, or Firm*—Blakely, Sokoloff, Taylor & Zafman LLP

[57] ABSTRACT

To determine when to service a cell queue in an ATM network, a cell scheduler can use an ideal service interval time. The ideal service interval time of each cell queue is the reciprocal of the bandwidth assigned to that cell queue. An interval based cell scheduler is then initialized by setting a time reference to zero and setting a next service time for each queue to the queue's ideal service interval. The cell scheduler then enters a repeating loop. During each iteration of the loop, the first nonempty cell queue having the smallest next service time value is selected. The selected queue is serviced and its next service time is updated by adding its ideal service interval. The time reference value is also updated. If all the queues are empty, then an idle time slot is allowed to pass. The cell queues may consists of queue groups. For example, several queues can be gathered into a queue group that assigned a single ideal service time. Within this queue group, each queue may be serviced equally using a fair queuing system.

14 Claims, 11 Drawing Sheets

I(1) = 10     T(1) = 10
I(2) = 6  →   T(2) = 6      AND TR = 0
I(3) = 4      T(3) = 4

| ITERATION | TR | T(1) | T(2) | T(3) | Tprev |
|---|---|---|---|---|---|
| 1  | 0  | 10 | 6  | [4]  | 4  |
| 2  | 4  | 10 | [6] | 8  | 6  |
| 3  | 6  | 10 | 12 | [8]  | 8  |
| 4  | 8  | [10] | 12 | 12 | 10 |
| 5  | 10 | 20 | [12] | 12 | 12 |
| 6  | 12 | 20 | 18 | [12] | 12 |
| 7  | 12 | 20 | 18 | [16] | 16 |
| 8  | 16 | 20 | [18] | 20 | 18 |
| 9  | 18 | [20] | 24 | 20 | 20 |
| 10 | 20 | 30 | 24 | [20] | 20 |
| 11 | 20 | 30 | [24] | 24 | 24 |
| 12 | 24 | 30 | 30 | [24] | 24 |
| 13 | 24 | 30 | 30 | [28] | 28 |
| 14 | 28 | [30] | 30 | 32 | 30 |
|    | 30 | 40 | [30] | 32 | 30 |
|    | 30 | 40 | 36 | [32] | 32 |
|    | 32 | 40 | [36] | 36 | 36 |
|    | 36 | 40 | 42 | [36] | 36 |
|    | 36 | [40] | 42 | 40 | 40 |

FIG. 3B

| ITERATION | TR | T(1) | T(2) | T(3) | Tprev | |
|---|---|---|---|---|---|---|
| 1 | 0 | 10 | 6 | [4] | 4 | ← QUEUE 3 EMPTY |
| 2 | 4 | 10 | [6] | 8 | 6 | |
| 3 | 6 | [10] | 12 | 8 | 10 | |
| 4 | 10 | 20 | [12] | 8 | 12 | |
| 5 | 12 | 20 | [18] | 8 | 18 | ← QUEUE 3 NON-EMPTY |
| 6 | 18 | 20 | 24 | [8] | 8 | |
| 7 | 18 | [20] | 24 | 22 | 20 | |
| 8 | 20 | 30 | 24 | [22] | 22 | |
| 9 | 22 | 30 | [24] | 26 | 24 | |
| 10 | 24 | 30 | 30 | [26] | 26 | |
| | 26 | 30 | 30 | 30 | | |

FIG. 3C

QUEUE SERVICE INTERVAL BASED CELL SCHEDULER WITH HIERARCHICAL QUEUING CONFIGURATIONS

FIELD OF THE INVENTION

The present invention relates to the field of computer networking. In particular the present invention discloses a cell scheduling system for an Asynchronous Transfer Mode (ATM) network.

BACKGROUND OF THE INVENTION

Asynchronous Transfer Mode (ATM) is a digital communication standard for transmitting information. In the Asynchronous Transfer Mode system, the information to be transmitted is divided into fifty-three byte units known as "cells." The fifty-three byte cells of information are transmitted from a source node to a destination node through an ATM network constructed of communication lines and ATM switches.

In an ATM system, information is communicated from a source node to a destination node through a defined path known as a "virtual circuit". The virtual circuit is set up when a connection is needed and later torn down when the connection is no longer needed. Each virtual circuit is defined by several parameters such as Quality of Service (QOS) parameters and traffic parameters, the latter of which may include a required bandwidth. Once a virtual circuit has been established, all cells will travel along the same set of intermediary nodes between the source node and the destination node until the virtual circuit is torn down. However, when a subsequent virtual circuit is established between the same source node and destination node, the subsequent virtual circuit may not consist of the same intermediary nodes.

Within each ATM node, the ATM node must switch ATM cells from incoming communication lines to outgoing communication lines. Since a virtual circuit may have a defined required bandwidth amount, the ATM node must carefully schedule cell servicing such that the virtual circuit receives its required bandwidth and QOS requirements. To perform this function, a cell scheduler is implemented for each outgoing communication line. The cell scheduler allocates the bandwidth of its associated communication line to the virtual circuits or groups of virtual circuits that are assigned to use that communication line. Then the cell scheduler must schedule cells from queues associated with each virtual circuit or virtual circuit group such that each receives its allocated bandwidth.

SUMMARY OF THE INVENTION

It is therefore, an object of the present invention to service a set of quality of service queues such that each queue receives its allocated bandwidth and unused bandwidth is shared fairly among active queues. This and other objectives are achieved by the interval based cell scheduler of the present invention.

In the interval based cell scheduler of the present invention, each cell queue is assigned an ideal service interval time. The ideal service interval time of each cell queue is the reciprocal of the bandwidth assigned to that cell queue. The scheduler is then initialized by setting a time reference to zero and setting a next service time for each queue to the queue's ideal service interval. The cell scheduler then enters a repeating loop. During each iteration of the loop, the first nonempty cell queue having the smallest next service time value is selected. The selected queue is serviced and its next service time is updated by adding its ideal service interval. The time reference value is also updated. If all the queues are empty, then an idle time slot is allowed to pass. The cell queues may consists of queue groups. For example, several queues can be gathered into a queue group that is assigned a single ideal service time. Within this queue group, each queue may be serviced equally using a fair queuing system.

Other objects, features, and advantages of present invention will be apparent from the accompanying drawings and from the following detailed description that follows below.

BRIEF DESCRIPTION OF THE DRAWINGS

The objects, features and advantages of the present invention will be apparent to one skilled in the art, in view of the following detailed description in which:

FIG. 3b illustrates a first example of the cell scheduling method of the present invention in operation.

FIG. 3c illustrates a second example of the cell scheduling method of the present invention in operation.

DETAILED DESCRIPTION OF THE PREFERRED EMBODIMENT

A method and apparatus for implementing an interval based cell scheduling mechanism is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to ATM based communication networks. However, the same techniques can easily be applied to any type of packet-switched communication network.

Figures 1A, 1B:
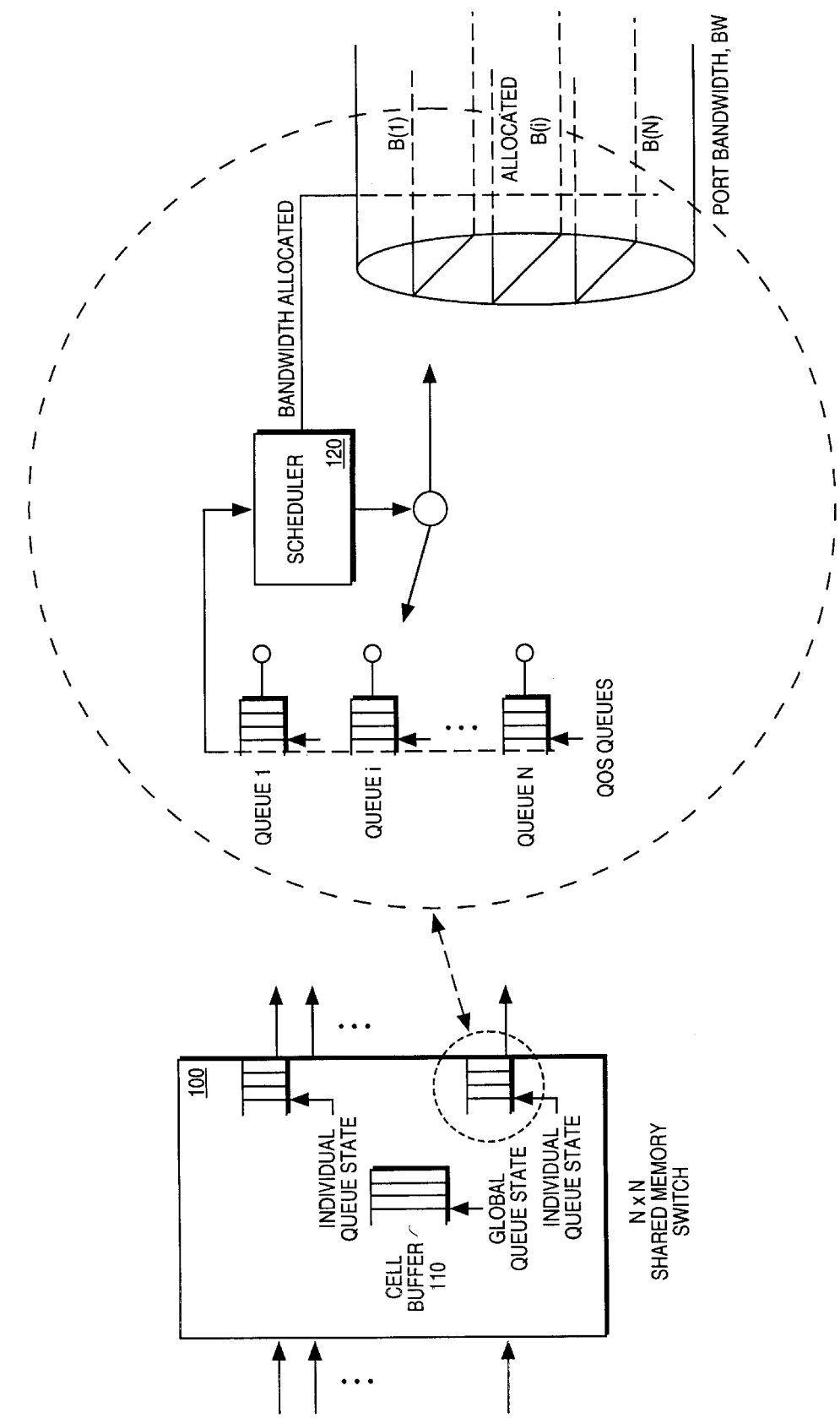
FIGS. 1a and 1b illustrate a block diagram of a shared memory ATM switch.

FIG. 1a illustrates a block diagram of a shared memory ATM switch 100. In FIG. 1a a global cell buffer 110 is used to store ATM cells that enter the shared memory ATM switch 100. Each ATM cell is then referenced using a set of address queues that are assigned for each outgoing communication line. The address queues store pointers to cells in the global cell buffer 110. When an ATM cell enters the shared memory switch 100 of FIG. 1a, the ATM cell is stored into the global cell buffer 110. Then, a cell address of cell location is created for that ATM cell and is placed in one of the outgoing address queues depending on the output port address for the ATM cell. Note that the shared memory ATM switch embodiment disclosed in the document is used for illustrative purposes only, the teachings of the present invention can be used in other switch architectures such as bus type switches with output buffers.

FIG. 1b illustrates a conceptual diagram for an outgoing port. In the outgoing port in FIG. 1b there is a set of N queues. Each queue stores cell addresses for ATM cells that need to be transmitted through the outgoing port. A scheduler 120 accesses each of the address queues such that all of the queues are served. Specifically, the scheduler 120 accesses each queue at a sufficient frequency such that the queue receives its allocated bandwidth. When the scheduler 120 schedules a queue for service, the scheduler fetches an ATM cell from the global cell buffer 110 using the cell address at the head of the address queue and transmits the ATM cell through the outgoing port.

Figure 2:
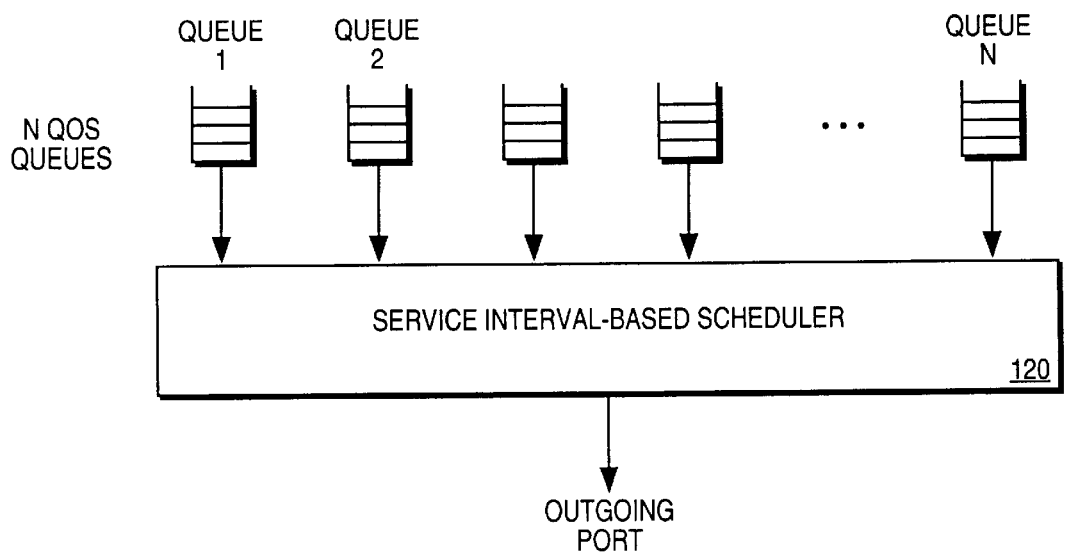
FIG. 2 illustrates a conceptual diagram of a scheduler that must service N quality of service queues.

FIG. 2 illustrates in detail the job that must be performed by a cell scheduler. In the illustration of FIG. 2, there are N queues that contain cell addresses to cells that need to be transmitted. Each of the N queues is assigned a certain amount of the outgoing port's bandwidth. Thus, the scheduler 120 must service each queue in a manner such that each queue receives its allocated bandwidth.

An Interval Based Cell Scheduler

A scheduler must perform two important functions: traffic isolation and statistical sharing. Traffic isolation refers to the fact that each queue should receive at least its allocated bandwidth no matter what the traffic load conditions are in other queues. Thus, an overload of one or more of the queues should not affect other non-overloaded queues. Statistical sharing is the technique of allowing the unused bandwidth of certain queues to be made available to other queues. For example, if one or more queues becomes empty, then the other nonempty queues will receive the bandwidth that was allocated to the empty queues. The allocation of unused bandwidth may be proportional to the bandwidth allocated to each queue.

To properly schedule each queue, the present invention uses a service interval assigned to each queue. The service interval is an interval time that may pass between each time the queue is serviced. The service interval is the inversion of the assigned bandwidth. To best illustrate the interval based scheduling system of the present invention, an example is provided wherein:

BW=the total bandwidth reserved for the cell scheduler out of the output port physical bandwidth in cells per second.

N=the number of queues that will be sharing the output port.

B(i)=For i=1 to N, B(i) is the allocated bandwidth for ith the queue in cells per second.

The allocated bandwidth B(i) is an important parameter that defines the transmission bandwidth for a virtual circuit or a group of virtual circuits in an asynchronous transfer mode network. The allocated bandwidth B(i) is used by a call admission control unit to admit or reject a call depending on the required bandwidth. As previously stated, the present invention uses the inverse of the allocated bandwidth, known as the ideal service interval I(i), as the primary variable which determines when cell scheduling will occur. The ideal service interval defines a maximum amount of time in seconds that may elapse between cells for a given queue being scheduled. Specifically:

I(i)=1/B(i)=the ideal service interval for the ith queue.

The scheduler creates a service time variable T(i) for each queue i where i=1 to N. The service time specifies a "time" when the queue should be serviced next. The service time variable T(i) is first initialized with the assigned service interval I(i). The scheduler then begins servicing the queues by starting with the queue j having the smallest service time T(j). This queue j is serviced and the service time T(j) is incremented using the service interval I(j). Then the queue j having the smallest service time T(j) is again serviced such that the scheduler repeats this pattern.

Figure 3A:
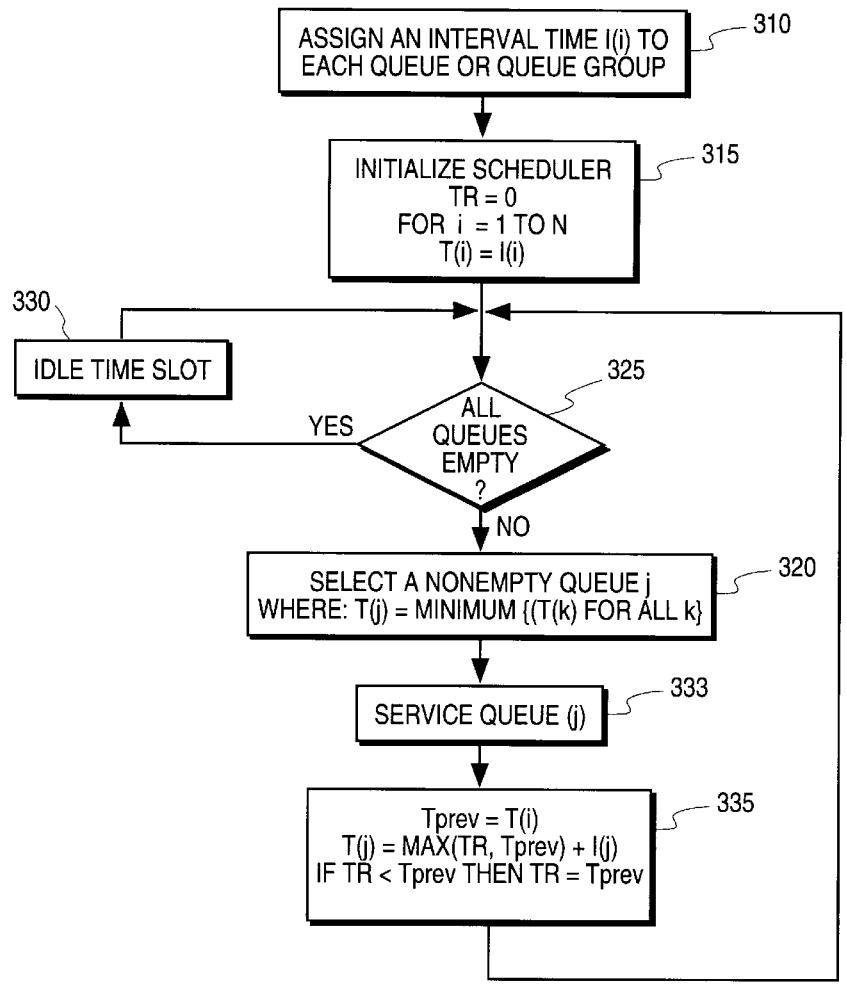
FIG. 3a illustrates a generalized flow diagram of the cell scheduling method of the present invention.

FIG. 3a illustrates a generalized flow diagram of the cell scheduling method of the present invention. At the first step 310, a cell interval time I(i) is assigned to each queue will be served. As previously mentioned, the interval time I(j) is equal to the inverse of the bandwidth B(j) allocated to a particular queue j. At step 315 the cell scheduler is initialized. Specifically, at step 315 a time reference variable TR is set to zero and a service time T(j) for each queue 1 through N is set to the queue's interval time I(j). After the initialization step 315, the cell scheduling method is ready to begin servicing cells from queues.

If all of the queues are empty at step 325 then the method proceeds to step 330 where an idle time slot is allowed to pass. After the idle time slot of step 330, the scheduling method returns to step 325 again.

At step 320, the scheduling method selects the first non empty queue j, where T(j) is the smallest T(k) where k=1 through N.

After having selected a nonempty queue j with the smallest service time T(j), then that queue j is serviced at step 333. Next, at step 335 the next service time T(j) for that queue j is determined. Specifically, a temporary variable Tprev is set to the current T(j) in order to store the previous service time. Then, the service time T(j) is set to the maximum of the time reference TR and the previous service time T(j) and this is added to the service time interval I(j) for that queue. Finally, the time reference value TR is updated. Specifically, if the time reference value TR is less than the previous service time Tprev of queue j, then the time reference value TR is set to the previous service time Tprev. The method then proceeds back to step 325 and repeats the same steps again.

FIG. 3b illustrates an example of the scheduling method of FIG. 3a in use. In FIG. 3b there are three connections 1, 2, and 3 where the service interval of connection one is set to ten, the service interval of connection 2 set to six and the service interval of connection 3 is set to four. These service intervals could be in units of microseconds. However, for simplicity of the example, the exact magnitude is not necessary.

According to the initialization stage of step 315, the time reference value TR is set to zero and the service time T(j) for connections 1, 2, and 3 is set to the connection's respective interval times. Thus, the service time for connection 1 is set to ten, the service time for connection 2 is set to six and the service time for connection 3 is set to four. The chart of FIG. 3b then illustrates a series of iterations of the scheduling method, starting with iteration 1 where the initial situation is presented.

Referring to step 320 of FIG. 3a, the nonempty queue having the smallest minimum service time T(j) is selected. Thus, in the first iteration of FIG. 3b, the service time T(3) for connection 3 is selected since the next service time value T(3) is four. Connection 3 is therefore serviced and the next service time value T(3) for connection three is incremented. Specifically, T(3) is set to the previous connection time plus the service interval time I(3) of four. Thus, the next service time T(3) for connection 3 is set to eight. The time reference value TR is also updated. The time reference value TR is set to the previous service time Tprev which is four.

Next, at iteration 2, the service time T(j) that is the smallest is for connection 2 with a service time T(2) of 6 such that connection 2 is serviced. The service interval of 6 then is added to the current service time to produce a next service time T(2)=12. At, the following iteration, queue three again has the earliest service time T(3) with the service time of 8 such that queue 3 is served again. The remainder of FIG. 3b illustrates how the algorithm would continue along provided that none of the queues become empty. In this example, tie resolution favors earlier index, but other resolution is also possible.

FIG. 3c illustrates a second example of the method of the present invention wherein one of the queues becomes empty while the scheduling method is operating. The example of FIG. 3c uses the same initial data as the example of FIG. 3b. In iteration one of FIG. 3c, queue 3 is selected as the first queue to service since queue 3 has the smallest service time T(3). After this iteration it is assumed that queue 3 becomes empty. In the next iteration, queue 2 is selected since it has the smallest service time T(2)=6. The service time T(2) for queue two is updated such that T(2)=12 after the update.

In iteration 3, queue 3 has the smallest service time with T(3)=8. However, since queue 3 is empty, the next smallest service time is selected. In this case, the smallest service time for nonempty queue is T(1)=10. Queue 1 is thus serviced and its next service time is updated such that T(1)=20 after the update. In iteration 4, queue 3 again has the smallest service time since T(3)=8. However, queue 3 is still empty so that the next smallest service time is that of for queue 2 which has a service time T(2)=12. Thus, queue 2 is serviced and its next service time is updated such that T(2)=18 after the update. In iteration 5, queue 3 is still empty such that the next smallest service time is T(2)=18 such that queue 2 is serviced again. After iteration 5, queue 3 receives some ATM cells such that queue 3 is no longer empty. Thus, at iteration 6 the service time T(3)=8 for queue 3 is selected and queue 3 is serviced. The next service time for queue 3 is set to be the current time reference TR plus queue 3's interval time I(3) of 4. Thus, the next time reference service time for queue three is set to be 22 since 18 (TR) plus 4 (I(3)) is 22.

The generalized scheduling method disclosed in FIG. 3a should be modified slightly in an implementation in order to prevent variable overflow. Specifically, the service time variables will wrap around after reaching a maximum value. One method of preventing variable overflow is disclosed in section 10.5 of the book "Internetworking with TCP/IP, vol. 2", Prentice Hall, N.J., 1991 by Douglas E. Comer and David L. Stephens (Herein after *Corner-Stephens*). The "Sequence Space Comparison" disclosed in the *Corner-Stephens* reference explains how it is unnecessary to maintain arbitrarily large sequence numbers as long as the maximum increment is no more than ½ of the largest integer that can be represented.

Figure 4:
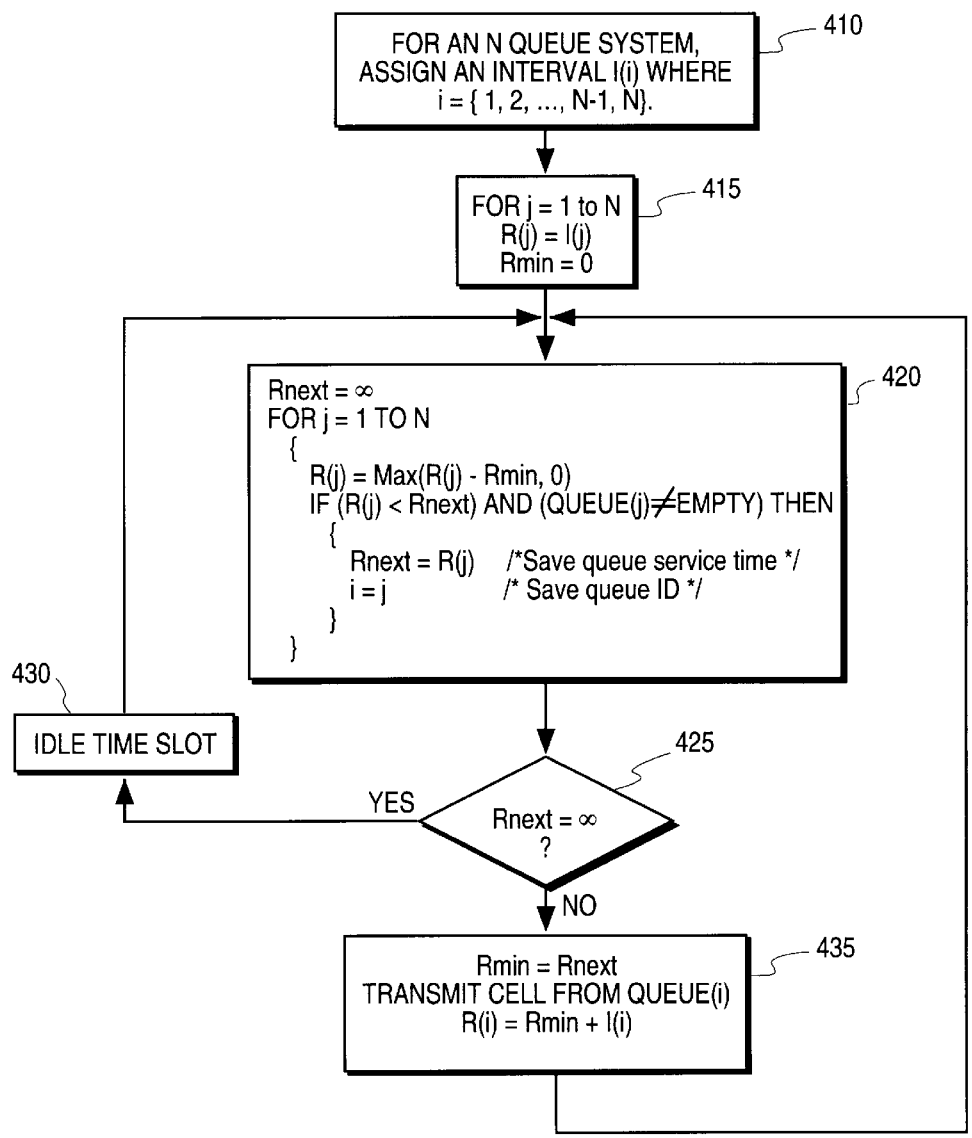
FIG. 4 illustrates a flow diagram of one embodiment of the cell scheduling method of the present invention for systems with a limited number of queues.

FIG. 4 illustrates one implementation of the scheduling method for systems that have a limited number of queues to service. The scheduling method implementation illustrated in FIG. 4 could be appropriate for systems with limited number of queues (e.g., 16 queues) depending on the line speed and processing speed.

Referring to FIG. 4, in step 410 the interval time for each queue is set. Next in step 415, a relative service time R(j) is set for each queue j to the interval time I(j) and a minimum relative service time Rmin is set to zero. The repeated scheduling steps begin at step 420.

In step 420 a variable Rnext is set to the highest value that the Rnext variable can hold. In FIG. 4 this value is illustrated as infinity, however in practice it will probably be the largest integer the variable can represent. Next, the step 420 goes through a loop that examines every queue 1 through N. The first step of the loop reduces the relative service time R(j) for each queue j by subtracting off the value Rmin. In the very first iteration nothing will be subtracted since Rmin is zero. A maximum value is selected between this subtraction and zero, such that the relative service time for any queue is never less-than-zero. This subtraction step ensures that the relative service times for the queues will not overflow.

Next, the loop in step 420 determines if the current queue j is not empty and if the relative service time R(j) for the current queue is smaller than the next relative service time Rnext. If the queue is nonempty and the relative service time R(j) for the current queue is smaller, then this relative service time R(j) becomes the next relative service time Rnext. Since Rnext is initially set at infinity, as long as the queue is not empty this queue's relative service time will become the next relative service time and this queues identity will be stored in variable i. Since this comparison is done for all of the queues using the loop, the queue with the smallest relative service time will be selected by the loop.

At step 425 Rnext is tested to see if it is equal to the infinity value. If Rnext is still infinity, then all the queues were empty such that the method proceeds to step 430 where an idle time slot is allowed to pass and then back to step 420.

However, if Rnext is set to a value other than infinity then a queue has been selected for service. At step 435, a cell is transmitted from the selected queue. Rmin is set to the current Rnext value since it was the smallest relative service time. The Rmin value will be used to reduce the relative service times during the next iteration such that variable overflow is prevented. Finally, the relative service time for the selected queue is updated. Specifically, queue i is set to the current Rmin plus the interval time I(i) for that queue. The cell scheduling method then proceeds back to step 420 where the same steps are repeated.

Hierarchical Queuing Configurations

Figure 5:
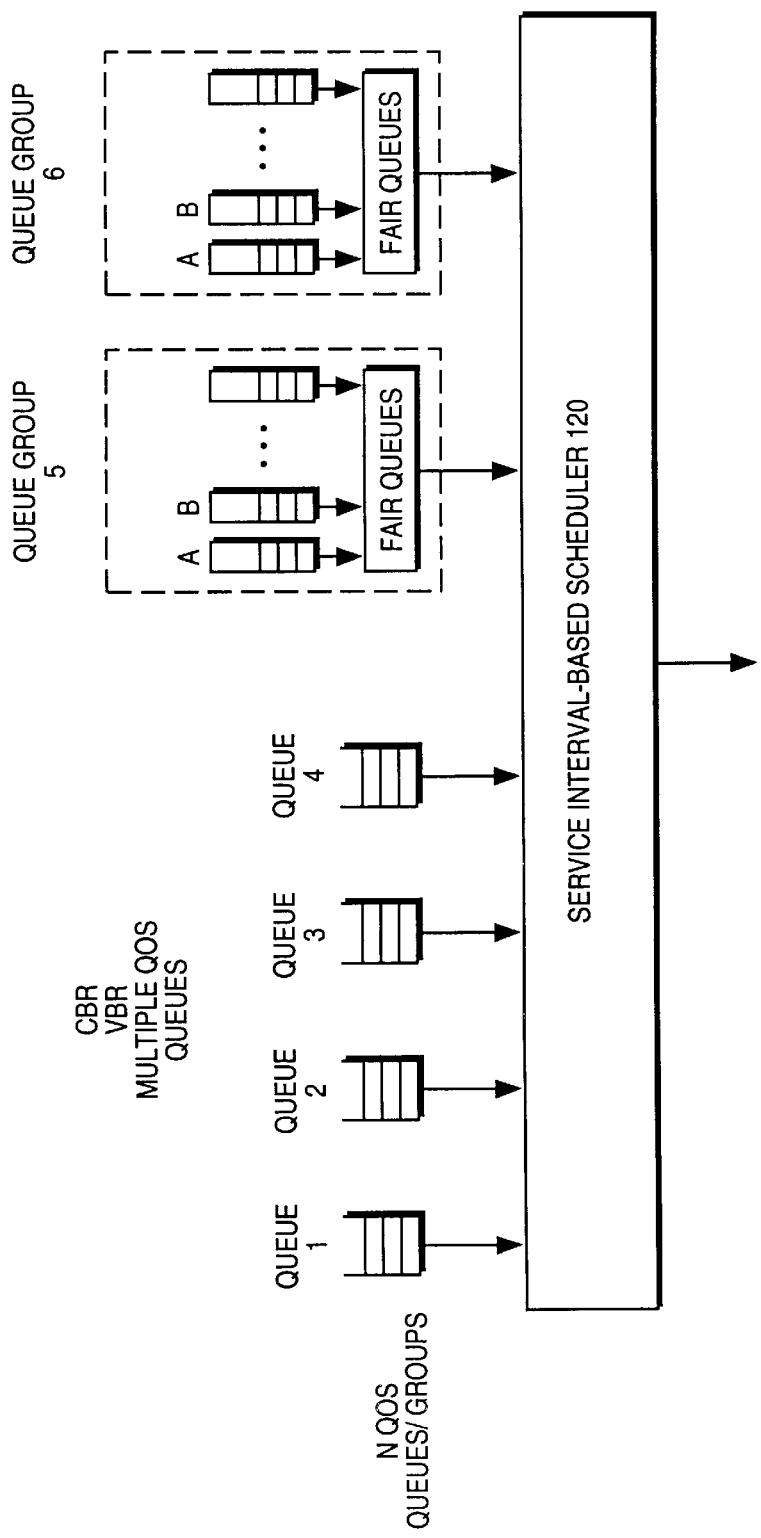
FIG. 5 illustrates cell scheduling system that uses hierarchical queues.

The interval based cell scheduling system of the present invention can be combined with other cell scheduling systems to implement other hybrid queuing configurations. Referring back to FIG. 2, a flat queuing system is illustrated where N queues are serviced by the interval based scheduler. However, FIG. 5 illustrates an alternate hierarchical queuing system that uses the interval based cell scheduling system. Specifically, in FIG. 5 the interval based cell scheduler services a set of individual queues and a separate set of queue groups. Specifically, in FIG. 5 there are four individual queues labeled one through four and two queue groups labeled queue group five and queue group six. The two queue groups, queue group five and queue group six, are serviced by the interval based scheduler as if they were individual queues. Specifically, the entire set of queues within each dotted perimeter is serviced as a single queue.

Within each queue group there is another queuing method that schedules cells within each group. In the illustration of FIG. 5, queue group five and queue group six each implement "fair queue" system. A fair queue group is a simple round robin scheduling system where each queue within the queue group receives an equal portion of the cell scheduling. Thus, each time the interval based cell scheduler services a queue group, one of the queues in that queue group is selected for service.

Figure 6:
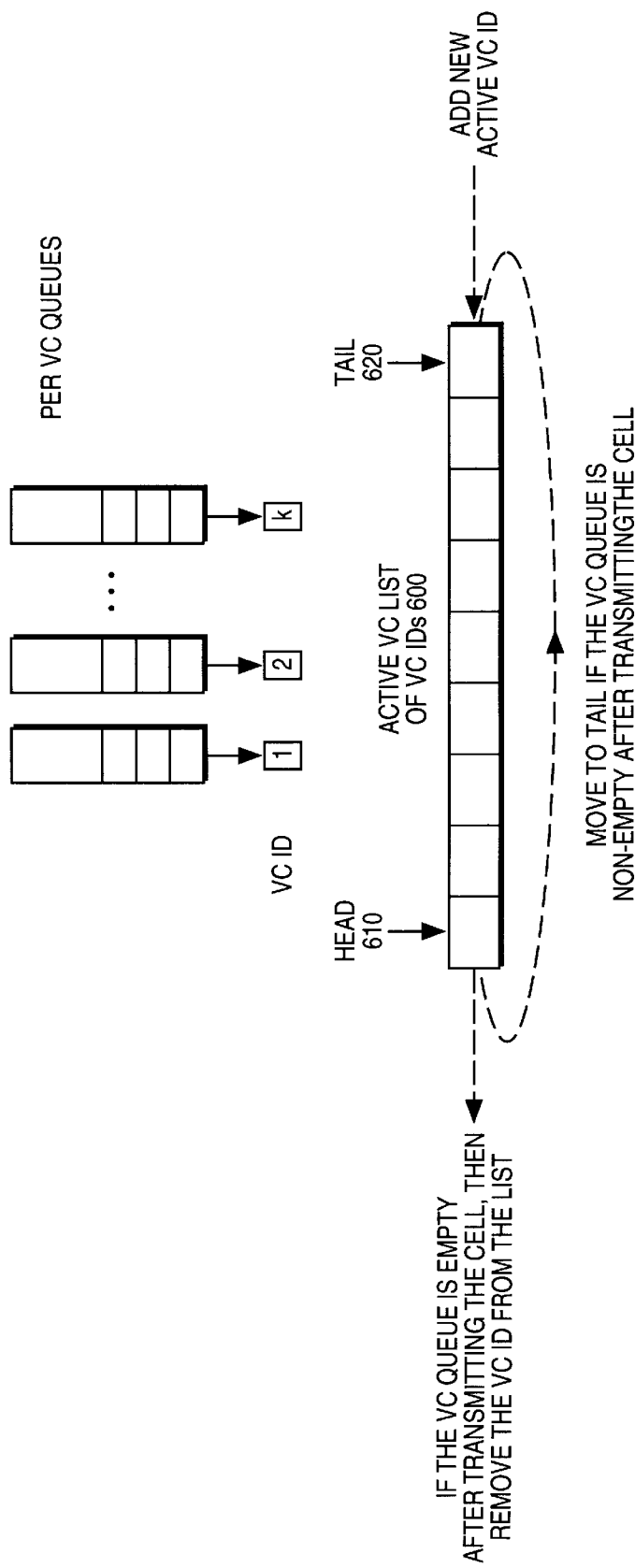
FIG. 6 illustrates a conceptual diagram of a fair queue implemented using a linked list.
Figure 7:
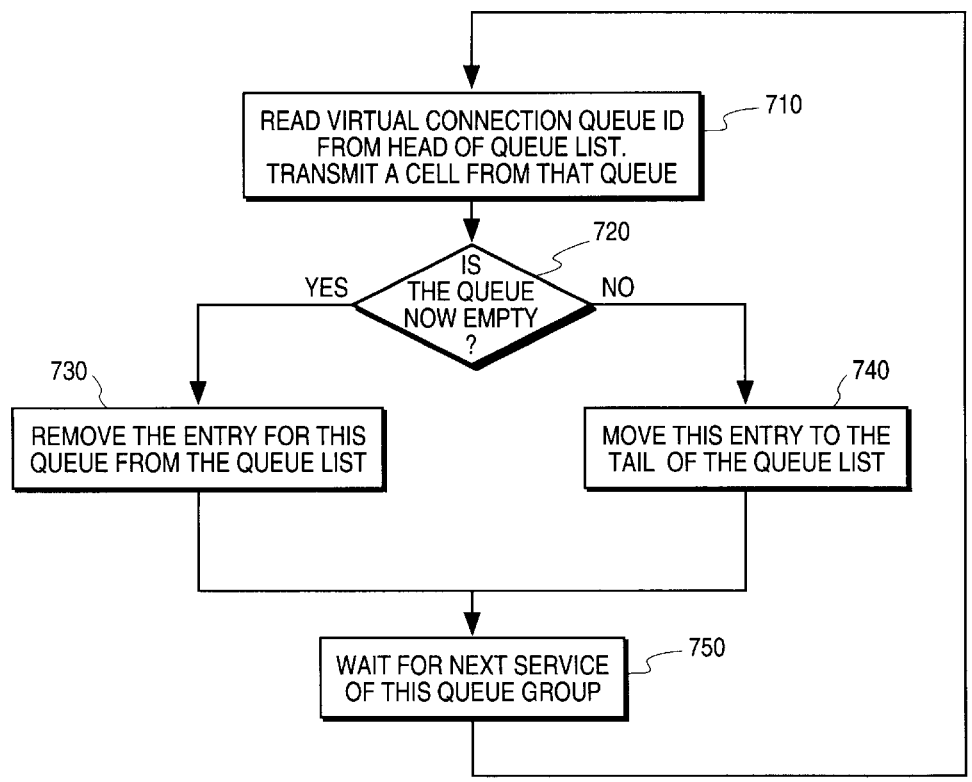
FIG. 7 illustrates a flow diagram that describes how a fair queue can be implemented using a linked list.

FIGS. 6 and 7 illustrate how a fair queue group can be implemented. FIG. 6 illustrates that each queue in the fair queue group is assigned a virtual circuit ID value. A linked list 600 of active virtual circuits is then created wherein each entry in the linked list 600 is identified by its virtual circuit ID value. The linked list 600 has a head 610 and a tail 620. During each service time for the queue group, the virtual circuit ID value at the head 610 of the linked list 600 is serviced. If the serviced queue then becomes empty, then that queue is removed from the active virtual circuit linked list 600. Otherwise, if the queue is not empty it is moved to the tail of the active virtual circuit linked list 600.

FIG. 7 illustrates a flow diagram that describes how the Fair queue is implemented. At step 710 the virtual circuit queue ID value is read from the head of the active virtual queue list. The cell is then transmitted from the queue with that virtual circuit queue ID value. Next, that queue is tested to see if the queue is empty at step 720. If the queue has become empty, then the queue is removed from the active queue linked list at step 730. If the queue has not become empty then the entry for that virtual circuit queue ID value is moved to the tail of the linked list at step 740. At step 750, the queue group waits until the next service time for the queue group. When the next service time arrives, the method moves back to step 710 and repeats the steps.

Figure 8:
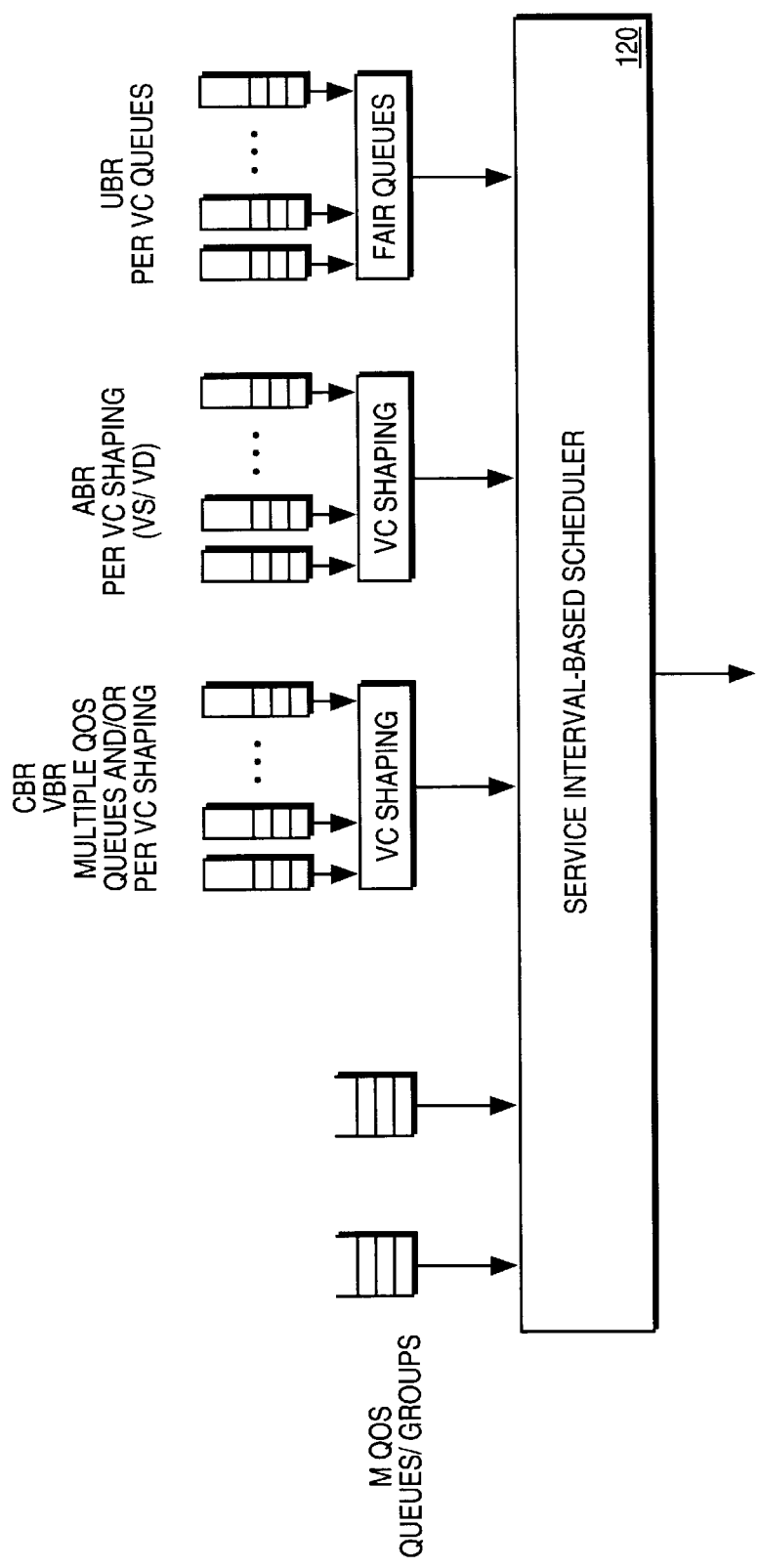
FIG. 8 illustrates cell scheduling system that uses hierarchical queues with VC shaping and interval based cell scheduling.

Other types of scheduling systems can also be combined with the interval based cell scheduling system. FIG. 8 illustrates another hierarchical queuing system that uses the interval based cell scheduling system as the main scheduler but also includes VC shaping schedulers. Specifically, in FIG. 8 VC shaping cell schedulers are used the schedule cells for a set of queue groups.

Figure 9:
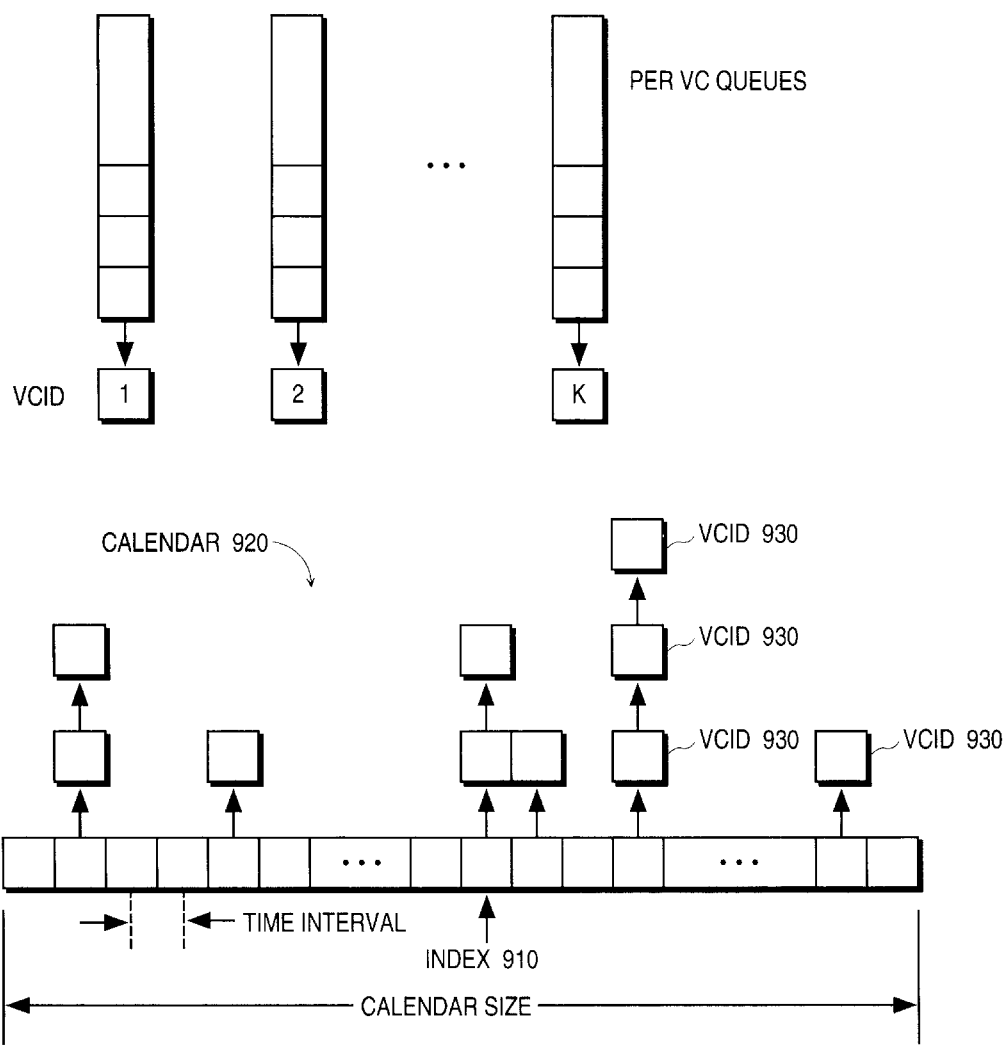
FIG. 9 illustrates cell scheduling system that uses VC shaping.

Per VC scheduling/shaping may be needed for better traffic isolation as well as the implementation of Virtual Source for ABR. In Per VC scheduling/shaping, cells from each VC queue are scheduled even if for the same traffic/QOS class. FIG. 9 illustrates one example of VC scheduling. The per VC scheduler of FIG. 9 uses a "calendar queue" 920 that comprises a series of time slot entries. The time difference between each time slot entry is one service interval I(i). Each active VC queue has an associated VC ID 930 in the calendar queue 920. There is a current time index 910 that points to the current reference time in the calendar queue 920. The position of each calendar time slot entry relative to the current index time 910 represents a relative number of time slots in the future.

When the scheduler is ready to service the cell from a calendar queue, the cell from the first VC queue in calendar time slot entry pointed by the index 910 is transmitted. If this VC queue is non-empty after the cell transmission, then the VC ID for that VC queue is moved into a future entry position with a distance from the current index of the inverse of the VC rate (e.g., 1/(Peak Cell Rate) for a Constant Bit Rate Queue). Each time the calendar queue is visited, its reference time index is moved one slot down. There may be more than one VC queue scheduled in one calendar time slot entry. If there are additional VCs in the calendar time slot entry to be scheduled, the additional VCs are moved to the next subsequent calendar time slot entry. The index 910 is then incremented and the next calendar entry is scheduled. If a cell arrives at an empty VC queue, then the empty VC queue's VC ID is added to the calendar queue at a calendar entry position that is the inverse the cell rate from the current index 910.

The foregoing has described an interval based cell scheduler. It is contemplated that changes and modifications may be made by one of ordinary skill in the art, to the materials and arrangements of elements of the present invention without departing from the scope of the invention.

We claim:

1. A method of scheduling cells from a plurality of cell queues, said cell queues organized into cell queue groups, said method comprising the steps of:

assigning an ideal service interval time to each of said cell queue groups, and all cell queues within each of said cell queue groups having a same quality of service;

assigning a next service time to each of said cell queue groups;

determining a selected cell queue group to service from said plurality of cell queue groups, said selected cell queue group having a smallest next service time and said selected cell queue group being nonempty;

servicing said selected cell queue group by servicing one of said cell queues in said selected cell queue group;

updating said next service time for said selected cell queue group using said ideal service interval time; and repeating said steps of selecting, servicing, and updating.

2. The method as claimed in claim 1, said method further comprising the step of:

initializing said next service times for each of said cell queue groups using the respective idea service times.

3. The method as claimed in claim 1, said method further comprising the step of:

updating a time reference value after updating a next service time, updating said time reference value comprising setting said time reference value equal to a smallest next service time of said cell queue groups.

4. The method as claimed in claim 1 wherein said step of updating the next service time for said selected cell queue group comprises incrementing the next service time for said selected cell queue group by said ideal service interval time for said selected cell queue group.

5. The method as claimed in claim 1, said method further comprising the step of:

allowing an empty time slot to pass if there is no non-empty queue group during said step of selecting.

6. The method as claimed in claim 1, said method further comprising the step of:

reducing a variable associated with each said next service time associated with each of said cell queue groups such that said variable associated with each said next service time associated with each of said cell queue groups does not overflow.

7. The method as claimed in claim 1 wherein at least one of said cell queue groups has an available bit rate (ABR) quality of service.

8. The method as claimed in claim 1 wherein said cell queue group is serviced selected by selecting one cell queue in said cell queue group using a fair queuing system.

9. A hierarchical queuing apparatus for servicing cells from a plurality of cell queues, said apparatus comprising:

a plurality of cell queue groups, having, each of said cell queues in a cell queue group having a same quality of service level, each of said cell queues storing representations of cells, each of said cell queue groups having an assigned ideal service interval and a next service time;

an output port, said output port for transmitting cells; and a cell scheduler, said cell scheduler selecting a cell queue group to service having a smallest next service time, servicing a cell queue in said selected cell queue group, and then updating said next service time for said selected cell queue group using said selected cell queue group's ideal service interval.

10. The apparatus as claimed in claim 9 wherein each ideal service interval equals the reciprocal of a bandwidth assigned to each cell queue group.

11. The apparatus as claimed in claim 9 wherein at least of one cell queue group comprises a group one cell group has having an available bit rate (ABR) quality of service level.

12. The apparatus as claimed in claim 9 wherein at least one cell queue group uses a round-robin scheduling system.

13. The apparatus as claimed in claim 9 wherein at least one cell queue group uses a VC shaping scheduling system.

14. The method as claimed in claim 1 wherein said selected cell queue group is serviced by selecting one cell queue in said selected cell queue group using a VC shaping scheduling system.

* * * * *